ated Aug. 23, 1955

2,716,116

SYNTHESIS OF SAPOGENIN DERIVATIVES

Thomas D. Fontaine and Harry M. Doukas, Silver Spring, Md., assignors to the United States of America as represented by the Secretary of Agriculture No Drawing. Application September 16, 1952, Serial No. 309,956

3 Claims. (Cl. 260—239.55)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the synthesis of sapogenin derivatives and especially to processes for reacting saturated or unsaturated steroidal sapongenins with lithium aluminum hydride under acidic conditions whereby to obtain a reduction accompanied by cleavage of the ring F of the sapogenin nucleus. A particular aspect of the invention relates to processes for the preparation of furostane diols and furostene diols by the reduction and cleavage of spirostanols and spirostenols, respectively, through the use of lithium aluminum hydride under acidic conditions.

Furostane diols (saturated dihydrosapogenins) have been prepared from spirostanols (saturated sapogenins) and spirostenols (unsaturated sapogenins). Thus Marker et al. [Jour. Am. Chem. Soc., vol. 69, pp. 2167–2211 (1947)] disclose that when either a spirostanol or a spirostenol is reduced by means of hydrogen in the presence of platinum oxide catalyst and glacial acetic acid, there is obtained a furostane diol. This reaction may be illustrated by the following equation:

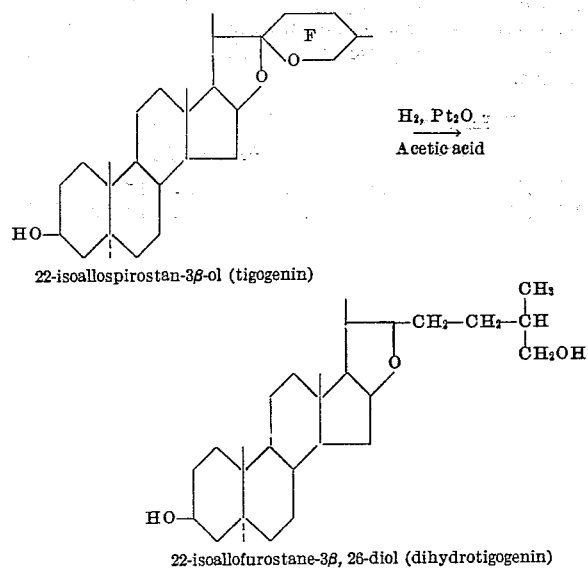

22-isoallospirostan-3β-ol (tigogenin)

22-isoallofurostane-3β, 26-diol (dihydrotigogenin)

With regard to nomenclature of the compounds of concern herein, reference is made to Rosenkranz et al., Nature, vol. 166, pp. 104–105 (1950).

It has now been found that when a saturated or unsaturated steroidal sapogenin is reacted with lithium aluminum hydride (LiAlH4) under acidic conditions a reduction and cleavage of the ring F occurs whereby the reduced derivative is obtained in high yield. The invention is particularly adapted for application to spirostanols and spirostenols whereby to obtain the corresponding furostane diols and furostene diols, respectively. An important feature of the instant process is that we can obtain unsaturated sapogenin derivatives directly. Thus one can prepare a furostene diol from a spirostenol. Heretofore, it has not been possible to obtain the unsaturated derivatives directly as the known reduction techniques led to saturation of the nuclear double bond. Thus in the process of Marker et al., cited above, the product was a furostane diol whether the starting material was a spirostanol or a spirostenol.

In accordance with the invention, the starting material, which may be a saturated or unsaturated steroidal sapogenin, as for example a spirostanol or a spirostenol, in particular diosgenin, tigogenin, or sarsasapogenin, is dissolved in an essentially anhydrous inert solvent, for example, diethyl ether, dibutyl ether, dioxane, glycol dimethyl ether, glycol diethyl ether, or pentamethylene oxide; diethl ether being preferred. The resulting solution is then acidified with an anhydrous non-reducible acid gas, as for example, hydrogen bromide or hydrogen chloride, the latter being preferred. Preferably the solution is saturated with the acid gas so as to maintain the mixture in an acid condition during the entire course of the reaction. The use of an acid medium is critical to obtain cleavage of the ring F; under alkaline conditions the desired reaction does not occur.

To the acid mixture is then added lithium aluminum hydride. This reagent may be added to the reaction mixture in small pea-size pieces or dissolved in anhydrous diethyl ether, or other inert solvent and the resulting solution added drop-wise to the reaction mixture. Usually it is preferred to use an excess of the reagent over the theoretically required amount thus to insure complete reaction.

The reaction is conducted at a temperature of from about 25° C. to the boiling point of the solvent, the temperature is not critical and the rate of reaction is increased with increase in temperature. Usually it is most convenient to boil the reaction mixture using a reflux condenser so that the reaction takes place at the boiling point of the inert solvent.

The following examples illustrate the invention in greater detail.

EXAMPLE 1

Δ5-22-isofurostene-3β,26-diol (dihydrodiosgenin)

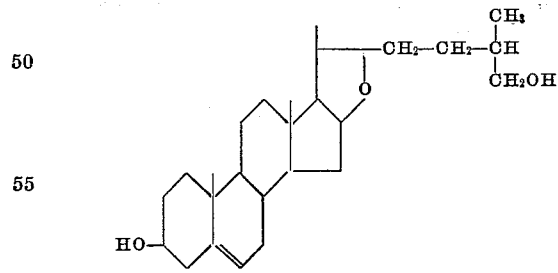

1.0 g. of Δ5-22-isospirosten-3β-ol (diosgenin) was placed in a standard taper 3-neck flask, equipped with an air-tight glass stirrer, a condenser with a calcium chloride (CaCl2) drying tube, and a glass stopper. The compound was dissolved by adding approximately 500 ml. of anhydrous diethyl ether (dried over sodium) and stirring. The glass stopper was removed and a glass gas tube inserted and the diethyl ether solution saturated at room temperature (25° C.) with anhydrous hydrogen chloride gas from a cylinder. The gas tube was removed and the glass stopper replaced. Solid LiAlH4, in pea-size amounts, was then added to the reaction mixture with vigorous stirring. Each piece of LiAlH4 was allowed to react before an additional amount was added. After all the LiAlH₄ (3 g.) had been added, the reaction mixture was refluxed gently for two hours. A few drops of water at a time were then added until the excess LiAlH₄ had been decomposed; then approximately 100 ml. of water was added. A grey suspension appeared in the water layer but dissolved completely on standing overnight to give a clear water layer. The ether layer was separated from the water layer (acidic) and the water layer was washed with additional amounts of ether. The combined diethyl ether fraction was washed with water until the washes were neutral, then concentrated to dryness. The yield of product was 0.90 g. (90 per cent). The $\Delta^5$-22-isofurostene-3$\beta$,26-diol (dihydrodiosgenin) was recrystallized from acetone, and was found to contain 77.77 percent of carbon and 10.84 per cent of hydrogen (calculated for carbon 77.83 per cent and for hydrogen 10.65 per cent). The product melted at 158–160° C. and gave an optical rotation value of $(\alpha)^{20}D$ —35° in chloroform.

Acetylation of $\Delta^5$-22-isofurostene-3$\beta$,26-diol with acetic anhydride, with a few drops of pyridine present, at 25° C. yielded $\Delta^5$-22-isofurostene-3$\beta$,26-diol 3,26-diacetate (dihydrodiosgenin diacetate). The product was found to contain 74.45 per cent of carbon and 9.73 per cent of hydrogen (calculated for carbon 74.36 per cent and for hydrogen 9.66 per cent). The product melted at 115–117° C. and gave an optical rotation of $(\alpha)^{20}D$ —39° in chloroform.

EXAMPLE 2

*22-isoallofurostane-3$\beta$,26-diol (dihydrotigogenin)*

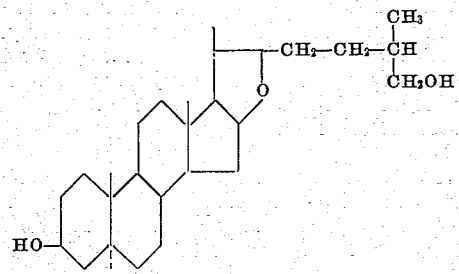

1.0 g. of 22-isoallospirostan-3$\beta$-ol (tigogenin) was reacted under the same conditions given in Example 1. The yield of product was 0.90 g. (90 per cent). The 22-isoallofurostane-3$\beta$,26-diol was recrystallized from acetone and was found to contain 77.41 per cent of carbon and 10.92 per cent of hydrogen (calculated for carbon 77.46 per cent and for hydrogen 11.08 per cent). The product melted at 163–166° C. and gave an optical rotation of $(\alpha)^{20}D$ —4° in chloroform.

Acetylation of 22-isoallofurostane-3$\beta$,26-diol at 25° C. yielded 22-isoallofurostane-3$\beta$,26-diol 3,26-diacetate (dihydrotigogenin diacetate). The product was found to contain 74.15 per cent of carbon and 10.04 per cent of hydrogen (calculated for carbon 74.06 per cent and for hydrogen 10.03 per cent). The product melted at 113–114° C. and gave an optical rotation of $(\alpha)^{20}D$—15° in chloroform.

EXAMPLE 3

*22-furostane-3$\beta$,26-diol (dihydrosarsasapogenin)*

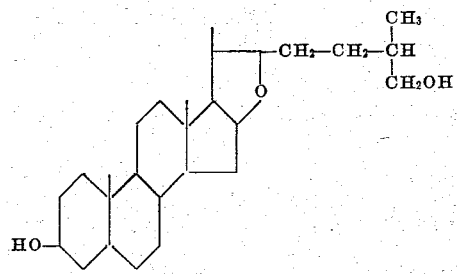

1.0 g. of 22-spirostan-3$\beta$-ol (sarsasapogenin) was reacted under the same conditions given in Example 1. The yield of product was 0.88 g. (88 per cent). The 22-furostane-3$\beta$,26-diol was recrystallized from acetone and was found to contain 77.45 per cent carbon and 11.05 per cent (calculated for carbon 77.46 and for hydrogen 11.08 per cent). The product melted at 157–160° C. and gave an optical rotation of $(\alpha)^{20}D$ —2° in chloroform.

We claim:

1. A process for preparing $\Delta^5$-22-isofurostene-3$\beta$,26-diol which comprises reacting, under substantially anhydrous conditions, $\Delta^5$-22-isospirosten-3$\beta$-ol with lithium aluminum hydride in an inert organic solvent acidified with hydrogen chloride.

2. A process for preparing 22-isoallofurostane-3$\beta$,26-diol which comprises reacting, under substantially anhydrous conditions, 22-isoallospirostan-3$\beta$-ol, with lithium aluminum hydride in an inert organic solvent acidified with hydrogen chloride.

3. A process for preparing 22-furostane-3$\beta$,26-diol which comprises reacting, under substantially anhydrous conditions, 22-spirostan-3$\beta$-ol with lithium aluminum hydride in an inert organic solvent acidified with hydrogen chloride.

References Cited in the file of this patent

UNITED STATES PATENTS

| | | |
|---|---|---|
| 2,373,133 | Marker | Apr. 10, 1945 |
| 2,599,481 | Plattner | June 3, 1951 |